(12) United States Patent
Harasawa

(10) Patent No.: US 6,807,370 B2
(45) Date of Patent: Oct. 19, 2004

(54) OPTICAL TRANSMISSION SYSTEM

(75) Inventor: Shin-ichirou Harasawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 617 days.

(21) Appl. No.: 09/929,361

(22) Filed: Aug. 15, 2001

(65) Prior Publication Data

US 2002/0131099 A1 Sep. 19, 2002

(30) Foreign Application Priority Data

Mar. 16, 2001 (JP) ........................................ 2001-076502

(51) Int. Cl.$^7$ .......................... H04B 10/08; H04B 10/02
(52) U.S. Cl. ............................. 398/13; 398/11; 398/18; 398/20; 398/177
(58) Field of Search ............................... 398/11, 21, 18, 398/20, 13, 30, 31, 32, 33, 177, 181, 154; 375/224, 227

(56) References Cited

U.S. PATENT DOCUMENTS

| | | | | |
|---|---|---|---|---|
| 4,833,668 A | * | 5/1989 | Rowley et al. | ................ 398/21 |
| 5,528,404 A | * | 6/1996 | MacKichan | .................. 398/21 |
| 6,075,633 A | * | 6/2000 | Deguchi et al. | ............ 398/190 |
| 6,404,523 B1 | * | 6/2002 | Morikawa et al. | ............ 398/79 |
| 6,452,701 B1 | * | 9/2002 | Terahara et al. | ............... 398/30 |

FOREIGN PATENT DOCUMENTS

| | | |
|---|---|---|
| JP | 04326218 A | 11/1992 |
| JP | 06268597 A | 9/1994 |

* cited by examiner

*Primary Examiner*—Leslie Pascal
*Assistant Examiner*—Dalzid Singh
(74) *Attorney, Agent, or Firm*—Staas & Halsey LLP

(57) ABSTRACT

An optical transmission system with a mechanism to locate a fault on a transmission line effectively and efficiently to ensure the quality of communication between end stations and repeaters. Repeaters respond to a monitoring control command sent from an end station, returning a monitoring report signal that indicates their current operating status and input/output signal conditions. In the end station, a monitoring report processor identifies a faulty link section of the optical transmission line, if the monitoring report signal indicates a fiber fault. The end station sends a troubleshooting control command to cause a relevant repeater to transmit a probing light pulse signal and a complementary light pulse signal simultaneously in opposite directions. Some of the probing light pulse is reflected back as a result of Rayleigh scattering. The end station locates the fiber fault by analyzing the backscatter, using the complementary light pulse signal for synchronization.

6 Claims, 16 Drawing Sheets

OPTICAL TRANSMISSION SYSTEM

BACKGROUND OF THE INVENTION

1. Field of the Invention

The present invention relates to an optical transmission system, and more particularly to an optical transmission system with a mechanism to locate a fault on an optical transmission line.

2. Description of the Related Art

The international telecommunication needs are rapidly growing in recent years, the major driving forces being business globalization and Internet proliferation. In such circumstances, submarine optical transmission systems are expected to be as important as satellite communications systems, to meet the increasing demands for more cost-effective, bandwidth-rich telecommunication service.

In submarine optical transmission systems, in-line repeaters are placed at certain intervals along the fiber optic cable laid under the sea, so that the attenuation losses of signals will be compensated for by intermediary optical amplification. Such submarine systems are required to offer the highest level of reliability because a trouble in the undersea equipment would cost a lot of time and money to repair. For this reason, the system must have an integral troubleshooting mechanism that pinpoints the fault in the event of such a failure.

Conventional fault locating techniques use a probing light signal that is transmitted from an end station on the land, so that the light will travel through the fiber optic links and repeaters until it is reflected at the point of a fiber break. By measuring the reflected light, the end station identifies the location of the fault. One problem with such conventional technique is that the probing light signal would be degraded before it reaches the broken point, because the light has to pass through a number of optical couplers in the repeaters. The worsened signal-to-noise ratio (SNR) would reduce the accuracy of fault location measurement, as well as increasing the time for analysis.

To solve the above problem, the researchers have proposed other fault locating techniques in which the probing light is transmitted by an undersea repeater. For example, the Unexamined Japanese Patent Publication No. 4-326218 (1992) proposes a system with an extra fiber optic cable dedicated for transporting a probing light signal, although the cost of the system would increase because of the additional undersea cable laid in parallel with the main signal cable. The Unexamined Japanese Patent Publication No. 6-268597 (1994) discloses a technique which serves the same purpose, but is different from the foregoing system in that the fiber optic cable for main communication channels is used to measure a reflected light.

The above-described conventional troubleshooting techniques, however, can only detect a fiber break, because the object of their measurement is confined to Fresnel reflected lights. In other words, the conventional techniques are unable to cover the other types of faults that would not cause Fresnel reflection. Not only being disrupted by a fiber break, optical transmission signals may also be degraded by increased fiber losses due to the diffusion of hydrogen or variations in temperature. Note that those kinds of fiber deterioration would never be observed as a Fresnel-reflected light. Trouble within a repeater is another failure mode that must be taken into consideration. It is therefore necessary to develop an enhanced fault locating system that covers various types of faults, including fiber deterioration and repeater failure, besides being capable of detecting a fiber break.

Yet another requirement for the system is a capability of controlling a repeater from a distant end station effectively and efficiently to make the repeater transmit a probing light signal, which none of the conventional proposals have offered. This requirement for the quality of interruption between an end station and repeaters has to be fulfilled in the future optical transmission systems.

SUMMARY OF THE INVENTION

In view of the foregoing, it is an object of the present invention to provide an optical transmission system which has a capability of locating a fault on a transmission line effectively and efficiently to ensure the quality of communication between end stations and repeaters.

To accomplish the above object, according to the present invention, there is provided an optical transmission system with a mechanism to locate a fault on an optical transmission line. This system comprises: repeaters which relay optical signals over the optical transmission line, and an end station which controls optical signal transmission and remotely manages the repeaters.

Each repeater comprises monitoring report signal generating unit and a light pulse signal sending unit. In response to a monitoring control command sent from the end station, the monitoring report signal generating unit monitors the current operating status and input/output signal conditions of the repeater itself, and it generates a monitoring report signal to inform the end station of the monitoring results. In response to a troubleshooting control command sent from the end station, the light pulse signal sending unit transmits a probing light pulse signal to the optical transmission line to locate a fault thereon, as well as sending a complementary light pulse signal that is complementary to the probing light pulse signal.

The end station, on the other hand, is equipped with a monitoring controller and a troubleshooting unit. The monitoring controller comprises: a monitoring command sending unit which sends a monitoring control command to the repeaters; and a monitoring report processor which monitors the operating status of the repeaters by analyzing the monitoring report signals received therefrom, as well as identifies a faulty link section if any problem with the optical transmission line is detected. The troubleshooting unit comprises: a troubleshooting command sending unit, a Rayleigh backscatter measurement unit, and a fault detection unit. The troubleshooting command sending unit sends a troubleshooting control command to one of the repeaters that is located near to the identified faulty link section. The Rayleigh backscatter measurement unit measures a Rayleigh backscattered light caused by the probing light pulse signal, using the complementary light pulse signal as a reference for synchronization. By analyzing the measured Rayleigh backscattered light, the fault detection unit locates the fault on the faulty link section.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings.

Figure 1:
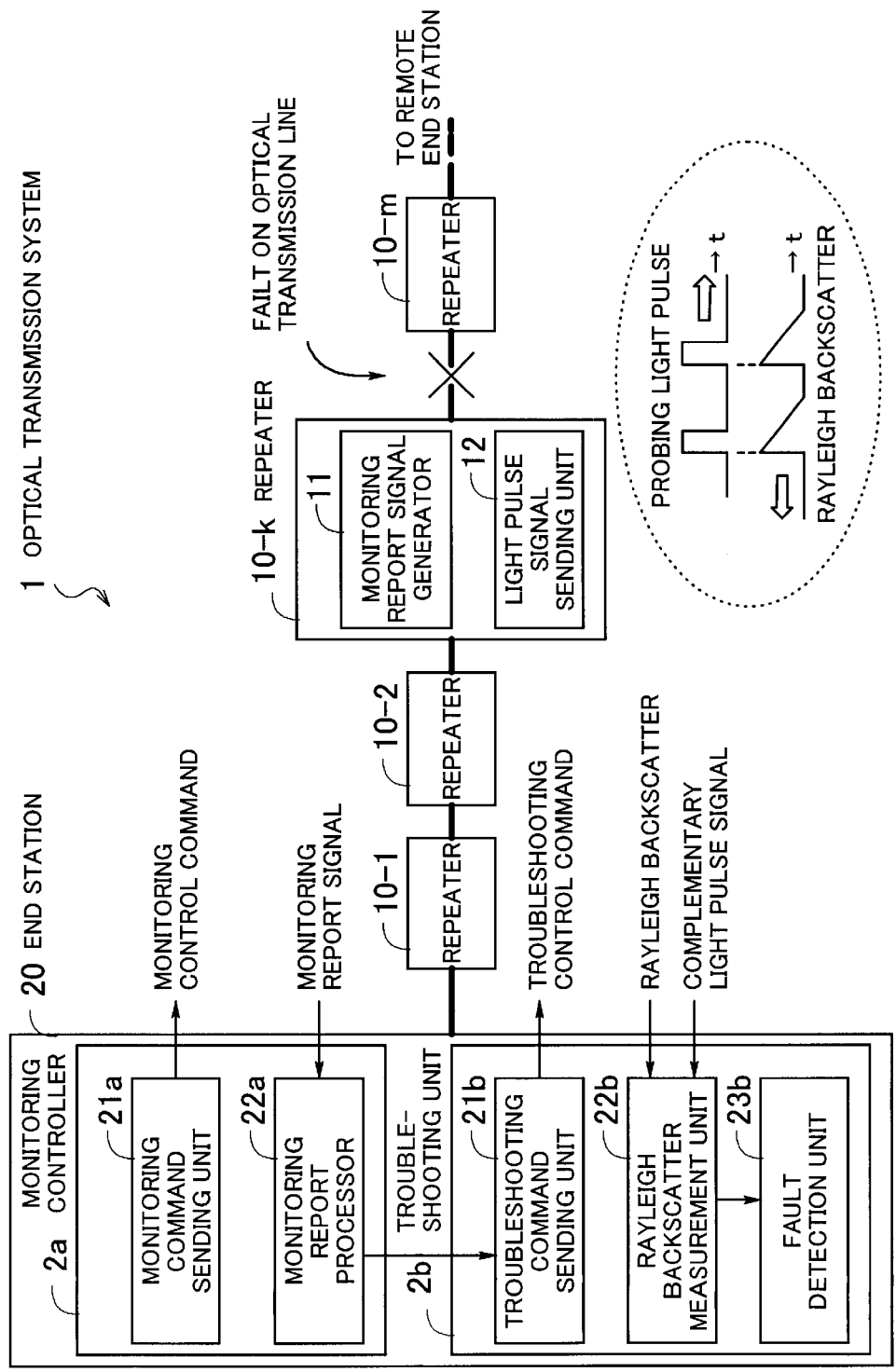
FIG. 1 is a conceptual view of an optical transmission system according to the present invention.

FIG. 1 is a conceptual view of an optical transmission system according to the present invention. This optical transmission system 1 comprises two end stations, a plurality of repeaters between the end stations, and optical transmission links (fiber optic cables) connecting them in series. For simplicity, FIG. 1 shows only one end station 20 and the first m repeaters 10-1 to 10-m connected to it. The system 1 might be deployed as a terrestrial network or submarine network. In undersea applications, the optical transmission lines and repeaters 10-1 to 10-m are laid under the sea, while the end station 20 is located in a building on the land.

Each repeater 10 (note: this reference numeral "10" is used to refer collectively to the repeaters 10-1 to 10-m and so on) is equipped with a monitoring report signal generator 11 and a light pulse signal sending unit 12 for diagnostic purposes. More specifically, the monitoring report signal generator 11 produces a monitoring report signal in response to a monitoring control command sent from the end station 20. This signal indicates the operating status of the repeater itself, such as its internal temperatures and the levels of electrical signals supplied to semiconductor laser devices. The monitoring report signal also reports the current condition of input/output signals including the main optical signals being transported. Those pieces of status information are referred to herein as the "monitoring result information." The monitoring report signal containing such monitoring result information is transmitted back to the requesting end station 20 in the form of an optical signal.

The light pulse signal sending unit 12, on the other hand, sends a probing light pulse signal to an intended link section of the optical transmission line, in response to a troubleshooting command received from the end station 20, in order to locate a fault on the optical transmission line. Some of this probing light pulse signal is deflected in the opposite direction in a phenomenon called the "Rayleigh scattering" (described later). The light pulse signal sending unit 12 also produces a complementary light pulse signal which is complementary to the above probing light pulse signal and transmits it towards the end station 20.

The end station 20 employs a monitoring controller 2a and a troubleshooting unit 2b. The monitoring controller 2a comprises a monitoring command sending unit 21a and a monitoring report processor 22a. The monitoring command sending unit 21a transmits a monitoring control command to request the repeaters 10 to report their status. Examining monitoring report signals returned from the repeaters 10, the monitoring report processor 22a observes their operating status and identifies which link section is faulty (if any such link problem is reported).

The troubleshooting unit 2b comprises a troubleshooting command sending unit 21b, a Rayleigh backscatter measurement unit 22b, and a fault detection unit 23b. The troubleshooting command sending unit 21b sends a troubleshooting command to one of the repeaters 10 that is located near to the identified faulty link section. The Rayleigh backscatter measurement unit 22b observes Rayleigh scattered lights caused by the transmitted probing light pulse signal, measuring the time of their occurrence, using the complementary light pulse signal sent from that repeater 10 for synchronization. The fault detection unit 23b analyzes the result of the Rayleigh backscatter measurement, thereby detecting (and locating) a fault on the optical transmission line.

The system employs fiber-optic cables as information-carrying media. Unlike pure crystals, the glass materials used in those cables exhibit some inhomogeneity in the density. Since the radius of such inhomogeneous portions is smaller than the wavelength of light, an incident light is partially deflected or scattered in different directions. This phenomenon is what has been referred to as the "Rayleigh scattering." When a probing light pulse signal is transmitted in one direction, the resulting Rayleigh scattered light comes back in the opposite direction. According to the present invention, the proposed system watches the waveform of this Rayleigh backscattered light in order to detect a fault on the optical transmission line. Besides locating a breakage of an optical fiber cable, the system even detects a point at which the cable exhibits an increased loss for any reason. The system can also detect a failure within a repeater 10, using the functions of the monitoring controller 2a.

Figure 2:
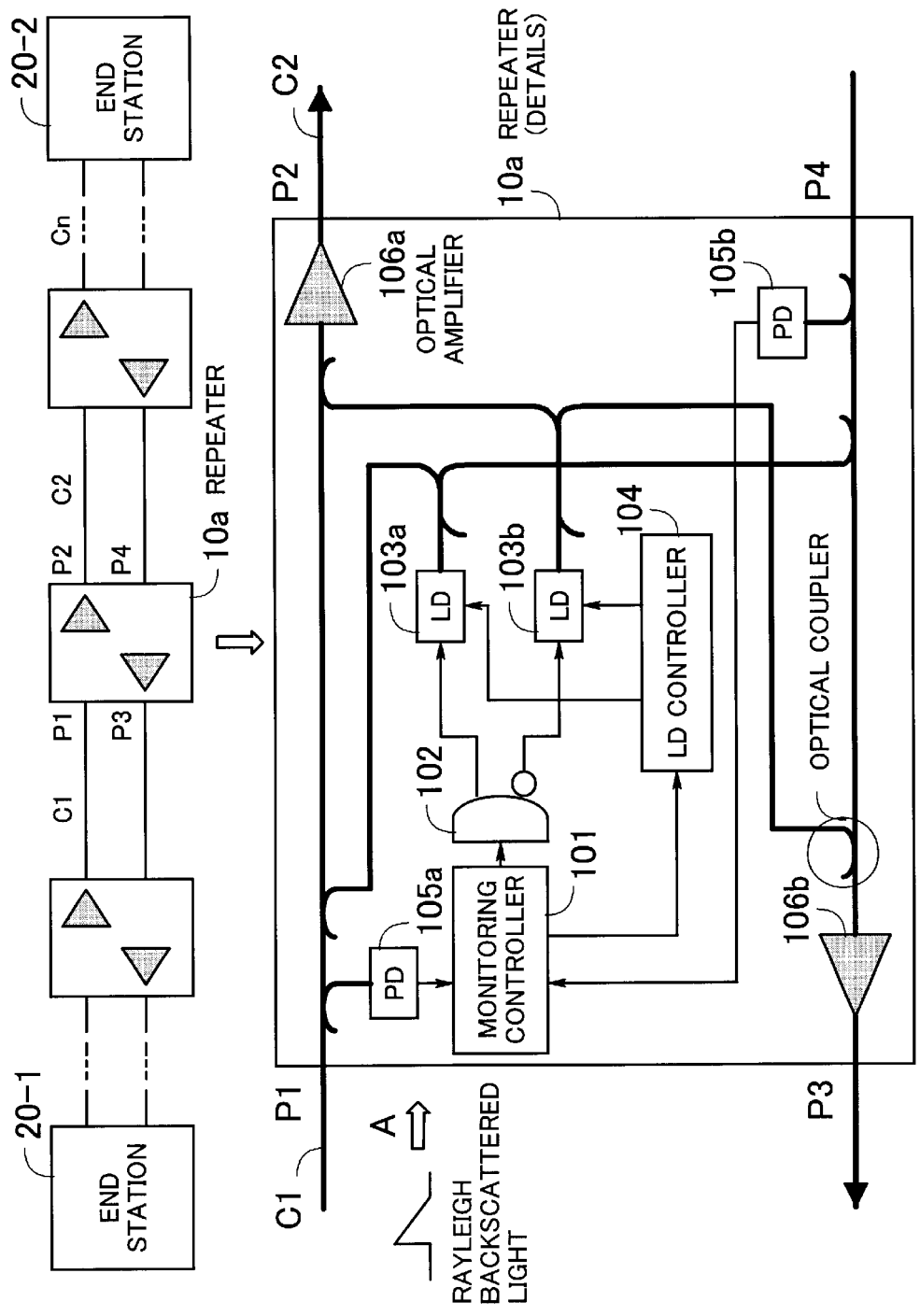
FIG. 2 shows the structure of a repeater.

The structure of the repeaters 10 will now be discussed in greater detail below. FIG. 2 shows the structure of a repeater 10a. This repeater 10a supports two-way communication paths between the two end stations 20-1 and 20-2, through its four optical ports P1 to P4. To implement the functions of the monitoring report signal generator 11 and light pulse signal sending unit 12 described above, it comprises the following components: a monitoring controller 101, a logic gate 102, laser diodes (LDs) 103a and 103b, an LD controller 104, photodiodes (PDs) 105a and 105b, and optical amplifiers 106a and 106b. In FIG. 2, the bold solid lines represent fiber optic connections, and the junction points with small arcs represent optical couplers (or optical splitters/combiners).

The repeater 10a has the following two operation modes: monitoring mode and failure detection mode. In monitoring mode, the repeater 10a receives monitoring control commands from the end station 20-2. More specifically, a command signal arriving at the photodiode 105b is converted into an electrical signal and supplied to the monitoring controller 101. The monitoring controller 101 takes in the monitoring control command if it is addressed to the repeater 10a. Parsing the received command, the monitoring controller 101 collects information about the condition of the repeater 10a and status of optical input/output signals being repeated. Those pieces of monitoring result information are subjected to the frequency shift keying (FSK) modulation, resulting in a monitoring report signal appearing at the input of the logic gate 102. At the same time, the monitoring controller 101 sends control signals to the LD controller 104 to drive the laser diodes 103a and 103b.

The logic gate 102 provides complementary outputs controlled by a single monitoring report signal input. That is, the logic gate 102 supplies one laser diode 103a with a normal active-high (positive logic) signal, while it provides the other laser diode 103b with an inverted active-low (negative logic) signal, based on the same input signal. With the power source under the control of the LD controller 104, and with the monitoring report signal timings provided from the monitoring controller 101, the two laser diodes 103a and 103b produce a monitoring light signal and a complementary monitoring light signal, respectively, both of which contain the same monitoring result information. Note here that these two light signals have different wavelengths. The repeater 10a sends out the monitoring report signal through the ports P1 and P4, and the complimentary monitoring report signal through the ports P3 and P2.

Incoming optical signals observed at the port P1 are the main optical signal from the previous repeater and Rayleigh backscattered lights. The optical amplifier 106a amplifies those signals and outputs them to the next repeater through the port P2, together with the complimentary monitoring light signal produced within the repeater 10a. Because of its inherent isolation between input and output, the optical amplifier 106a prevents the outgoing signal at the output port P2 from propagating back to the input port P1.

As for the other direction, the main optical transmission signal from the upstream repeater arrives at the input port P4, along with Rayleigh backscattered lights. The optical amplifier 106b amplifies those signals and outputs them to the next repeater through the output port P3, together with the complimentary monitoring light signal produced within the repeater 10a. Because of its inherent isolation between input and output, the optical amplifier 106b prevents the outgoing signal at output the port P3 from propagating back to the input port P4.

In failure detection mode, the repeater 10a receives a troubleshooting control command from the end station 20-2. More specifically, the command signal arriving at the photodiode 105b is converted into an electrical signal and supplied to the monitoring controller 101. The monitoring controller 101 takes in the troubleshooting control command if it is addressed to the repeater 10a. Parsing the received command, the monitoring controller 101 supplies the logic gate 102 with a source signal for generating light pulse signals. At the same time, the monitoring controller 101 sends appropriate control signals to the LD controller 104 to drive the laser diodes 103a and 103b.

The logic gate 102 supplies one laser diode 103a with a normal active-high (positive logic) signal, while it provides the other laser diode 103b with an inverted active-low (negative logic) signal, based on the same light pulse source signal. With the power source under the control of the LD controller 104, and with the source signal timings provided from the monitoring controller 101, those laser diodes 103a and 103b produce a light pulse signal (referred to as the "probing light pulse signal") and a complementary light pulse signal for failure detection purposes. The repeater 10a sends out the produced probing light pulse through the ports P1 and P4, and the complementary light pulse signal through the remaining ports P3 and P2.

As the probing light pulse travels through the fiber, some of that light signal is reflected back in the opposite direction as a result of Rayleigh scattering. FIG. 2 shows an example of this Rayleigh backscattered light observed at the port P1. More specifically, the probing light pulse sent out to the link C1 is scattered back in the direction indicated by the arrow A. The optical amplifier 106a receives this Rayleigh scattered light through the port P1 and amplifies and sends out it to the next link section C2 through the port P2. Being amplified at each repeater along the path, the scattered light travels over the fiber optic cables C2, C3, . . . Cn, finally reaching the remote end station 20-2. When a failure of the fiber optic cable C1 is reported, the end station 20-2 measures the incoming Rayleigh scattered light, using the complementary light pulse signal with a different wavelength as the reference for synchronization. In this way, the end station 20-2 locates the fault on the link section C1.

Figure 3:
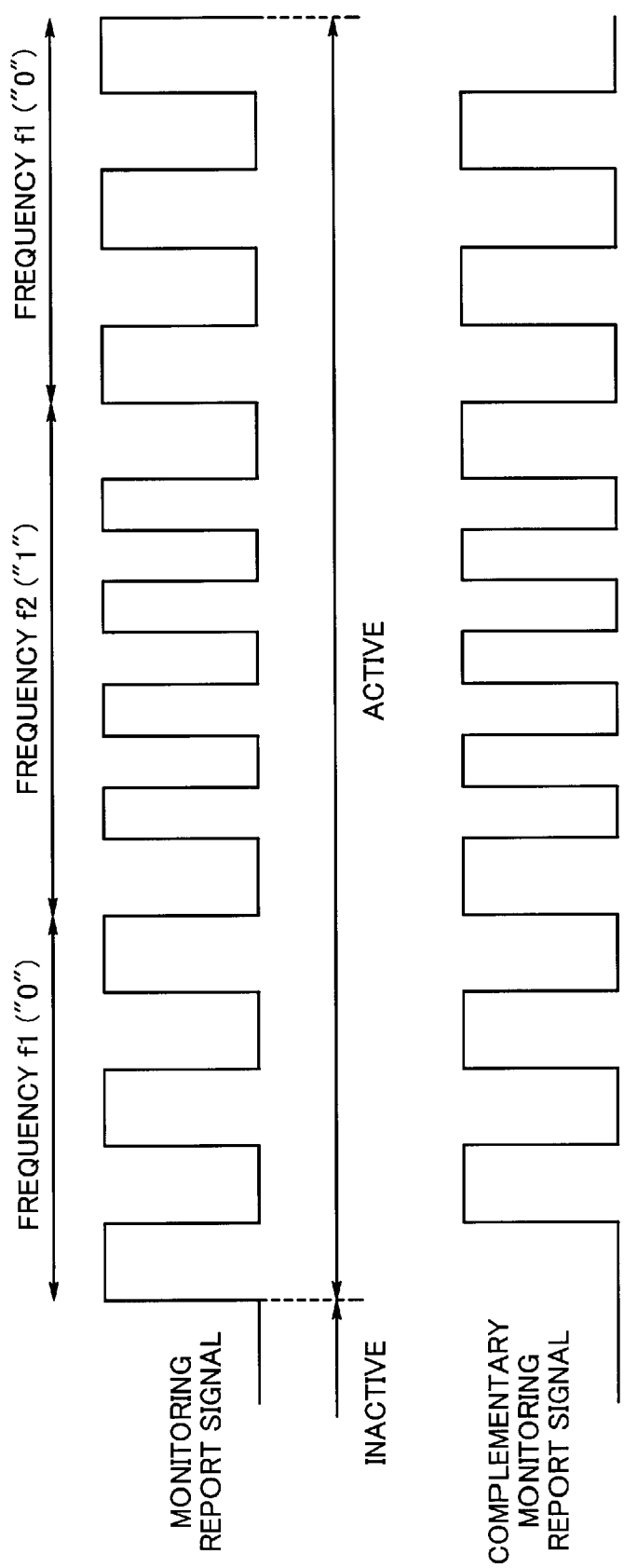
FIG. 3 is a timing diagram showing light emissions in monitoring mode.
Figure 4:
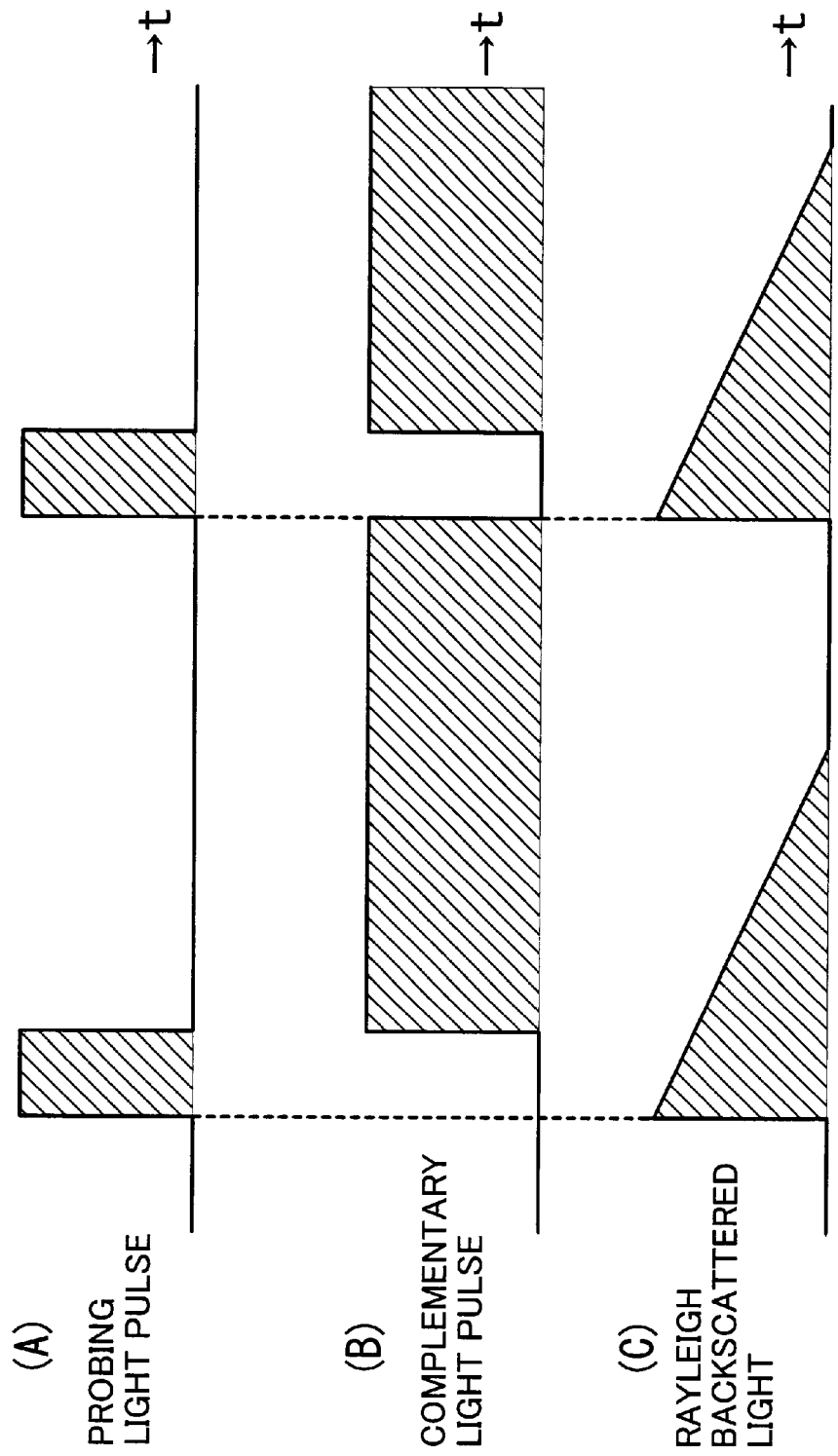
FIG. 4 is a timing diagram showing light emissions from laser diodes in failure detection mode and a resulting Rayleigh scattered light.

As previously stated, the laser diodes 103a and 103b in the repeater 10a emit a monitoring report signal and a complimentary monitoring report signal in monitoring mode. FIG. 3 shows their light emitting operation when they are activated in monitoring mode. The monitoring result information is encoded with FSK modulation techniques, where two frequencies f1 and f2 represent binary signal states. For example, one frequency f1 is assigned to one signal state "0," and the other frequency f2 to the other state "1." In failure detection mode, on the other hand, the laser diodes 103a and 103b emit a probing light pulse signal and a complementary light pulse signal, respectively. FIG. 4 is a timing diagram which illustrates such light emissions in failure detection mode, including a probing light pulse signal (A) and a complementary light pulse signal (B), as well as showing Rayleigh backscatter (C) resulting from the signal (A) The hatched portions of FIG. 4 indicate the presence of active lights.

Figure 5:
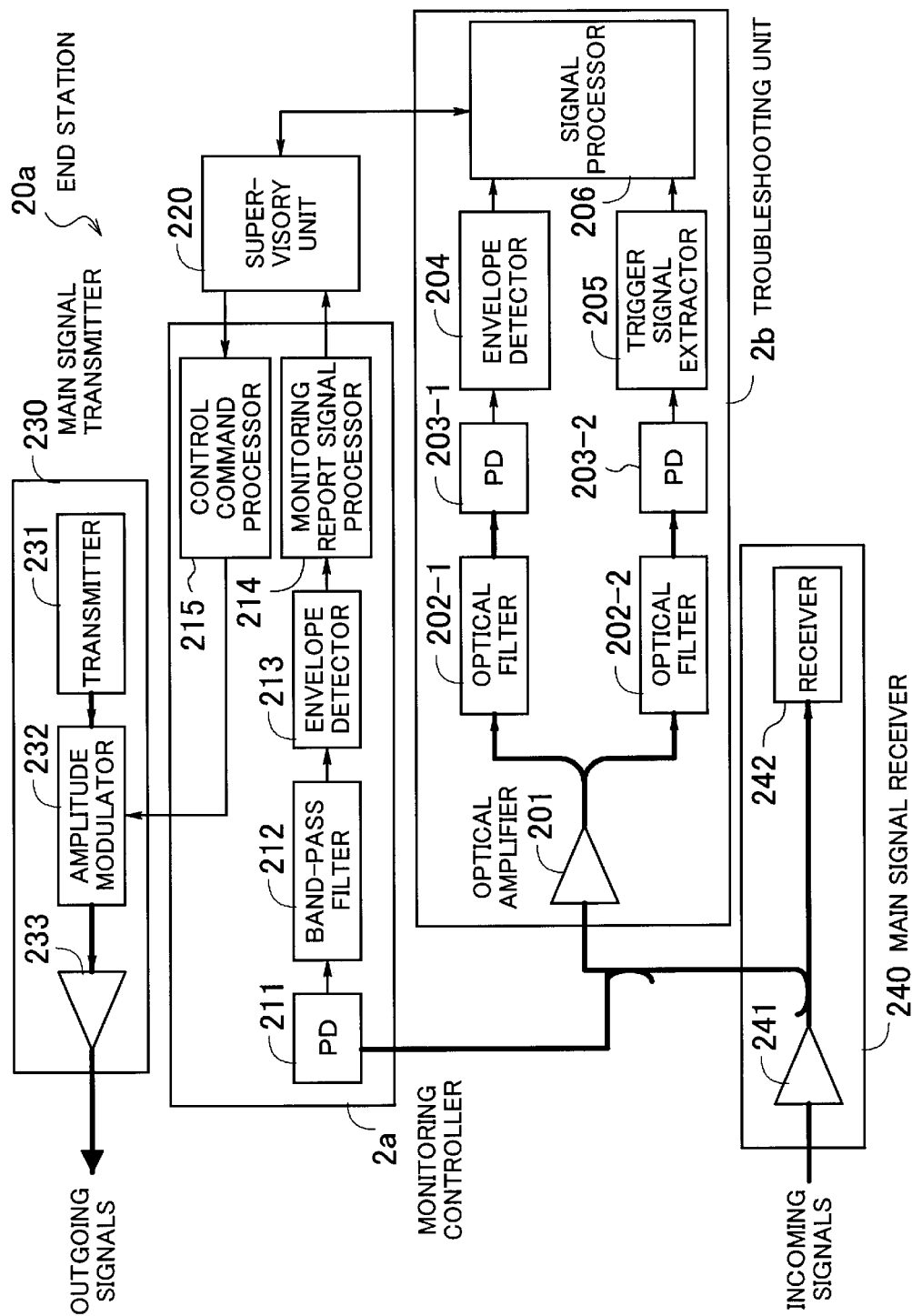
FIG. 5 shows the structure of an end station.

Referring next the FIG. 5, the structure of the end stations 20 will now be discussed in greater detail below. FIG. 5 shows an end station 20a, which is largely divided into the following functional blocks: a monitoring controller 2a, a troubleshooting unit 2b, a supervisory unit 220, a main signal transmitter 230, and a main signal receiver 240. In FIG. 4, the bold solid lines represent fiber optic connections, and the junction points with small arcs represent optical couplers (or optical splitters/combiners).

The main signal transmitter 230 comprises a transmitter 231, an amplitude modulator 232, and an optical amplifier 233. The transmitter 231 controls the transmission of a main optical signal. The amplitude modulator 232 modulates the amplitude of the main optical signal with given input signals such as monitoring control commands and troubleshooting control commands mentioned earlier. With the amplitude modulation, these control commands are superimposed on the main optical signal. The optical amplifier 233 directly amplifies the modulated optical signal for delivery to the nearest repeater 10.

The main signal receiver 240 comprises an optical amplifier 241 and a receiver 242. The optical amplifier 241 amplifies incoming light signals, and the receiver 242 receives the main signal contained in the amplified light signals.

The supervisory unit 220 manages the entire process of status monitoring and troubleshooting activities by controlling the monitoring controller 2a and troubleshooting unit 2b. While it is not shown in FIG. 5, a maintenance console is connected to the supervisory unit 220 to allow the operator to interact with the system.

The monitoring controller 2a comprises a photodiode 211, a band-pass filter 212, an envelope detector 213, a monitoring report signal processor 214, and a control command processor 215. The photodiode 211 receives a part of the incoming optical signals amplified by the optical amplifier 241 and converts it into an electrical signal. The band-pass filter 212 passes a particular range of wavelengths, including that of the monitoring report signal. The envelope detector 213 performs envelope detection, extracting the baseband waveform of the monitoring report signal. The monitoring report signal processor 214 decodes the monitoring report signal to provide the supervisory unit 220 with the content of the report. The control command processor 215 performs coding of a monitoring control command or troubleshooting control command according to instructions from the supervisory unit 220. The coded command signal is then supplied to the amplitude modulator 232.

The troubleshooting unit 2b comprises an optical amplifier 201, two optical filters 202-1 and 202-2, two photodiodes 203-1 and 203-2, an envelope detector 204, a trigger signal extractor 205, and signal processor 206. The optical amplifier 201 amplifies the incoming optical signals. The optical filter 202-2 extracts a complementary light pulse signal out of the amplified incoming optical signals. The photodiode 203-2 converts the complementary light pulse signal into an electrical signal. The trigger signal extractor 205 detects each edge of the complementary light pulse signal and supplies it to the signal processor 206 for use as a trigger signal.

The other optical filter 202-1 extracts a Rayleigh backscattered light out of the amplified incoming optical signals. The photodiode 203-1 converts the received Rayleigh backscattered light into an electrical signal. The envelope detector 204 detects the envelope of this signal, thus extracting its baseband waveform. Based on the trigger signal supplied from the trigger signal extractor 205, the signal processor 206 analyzes the baseband waveform of the Rayleigh backscattered light, thereby locating a fault on the optical transmission line. Here, the envelope detector 204 uses a technique known as the optical time-domain reflectometry (OTDR) to measure the backscatter with reference to the detected trigger signal. The result of the OTDR measurement is reported to the supervisory unit 220.

Figure 6A:
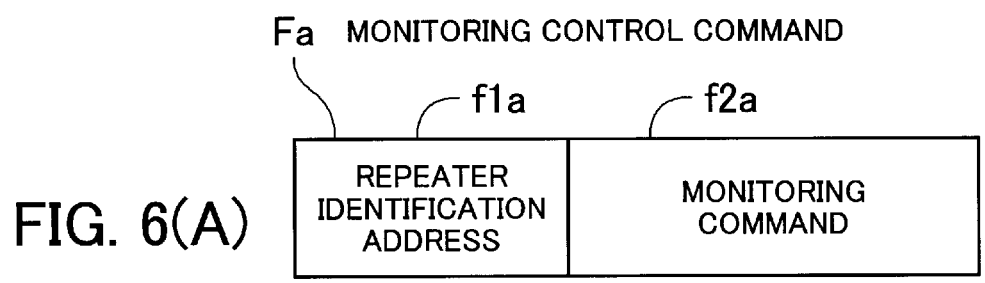
FIG. 6(A) shows a format of monitoring control commands.
Figure 6B:
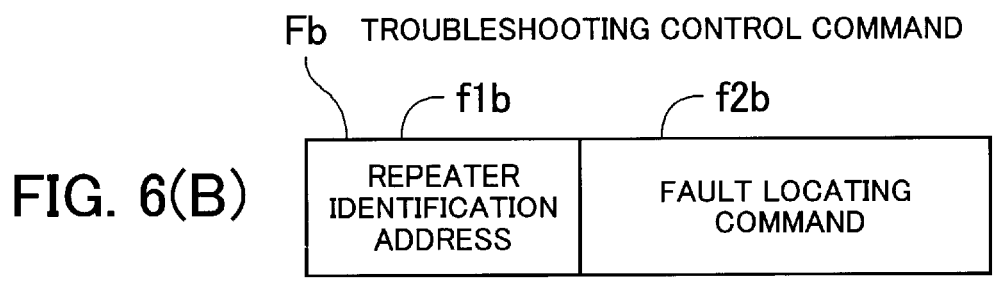
FIG. 6(B) shows a format of troubleshooting commands.

The frame format of monitoring control commands and troubleshooting control commands are shown in FIGS. 6(A) and 6(B). Referring first to FIG. 6(A), the monitoring control command frame Fa consists of a repeater identification address field f1a and a monitoring command field f2a. Each repeater is previously assigned a unique address. When sending a monitoring control command to a particular repeater of interest, the end station 20 puts the address of that repeater into the repeater identification address field f1a, besides setting an intended command codeword in the monitoring command field f2a.

Likewise, the troubleshooting control command frame Fb consists of a repeater address field f1b and a fault locating command field f2b. When requesting a particular repeater to emit a probing light pulse signal and its complementary counterpart, the end station 20 puts the address of that repeater into the repeater identification address field f1b, besides setting a necessary command codeword into the fault locating command field f2b.

Figure 7:
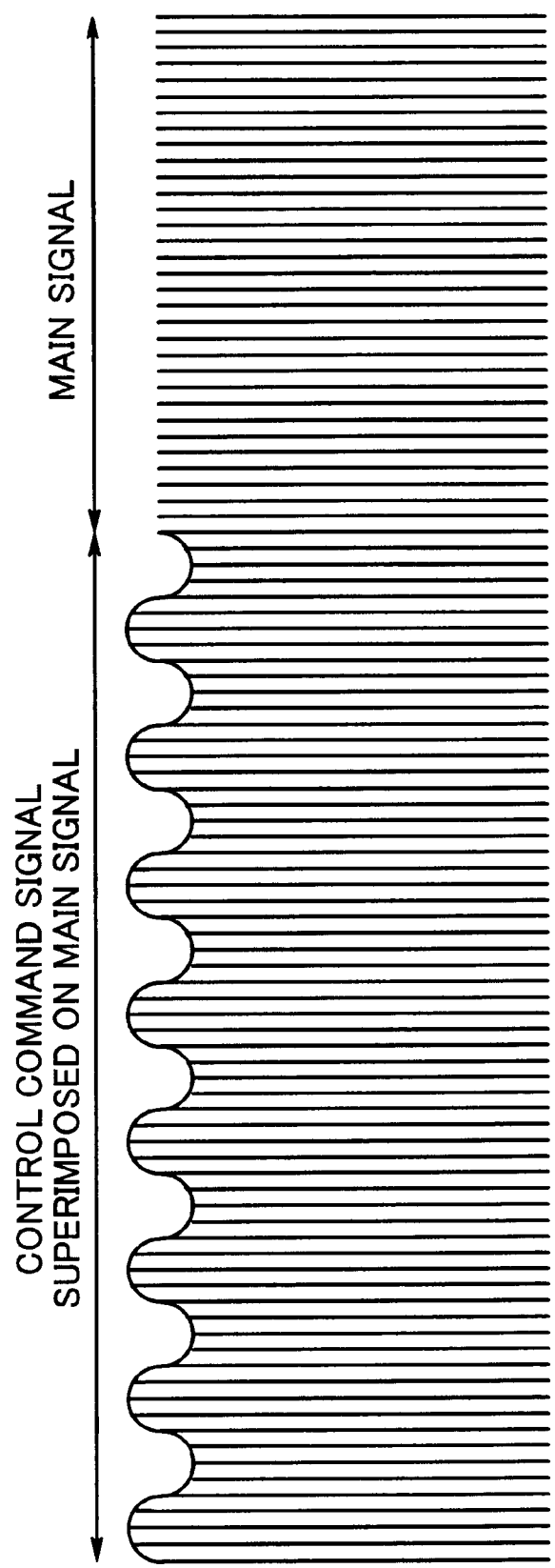
FIG. 7 shows a lightwave modulation with which monitoring control commands and troubleshooting commands are transmitted.

FIG. 7 shows a lightwave modulation with which a monitoring control command or a troubleshooting command is transmitted. In this way, command signals are overlaid on the main optical signal with an amplitude modulation technique.

Figure 8:
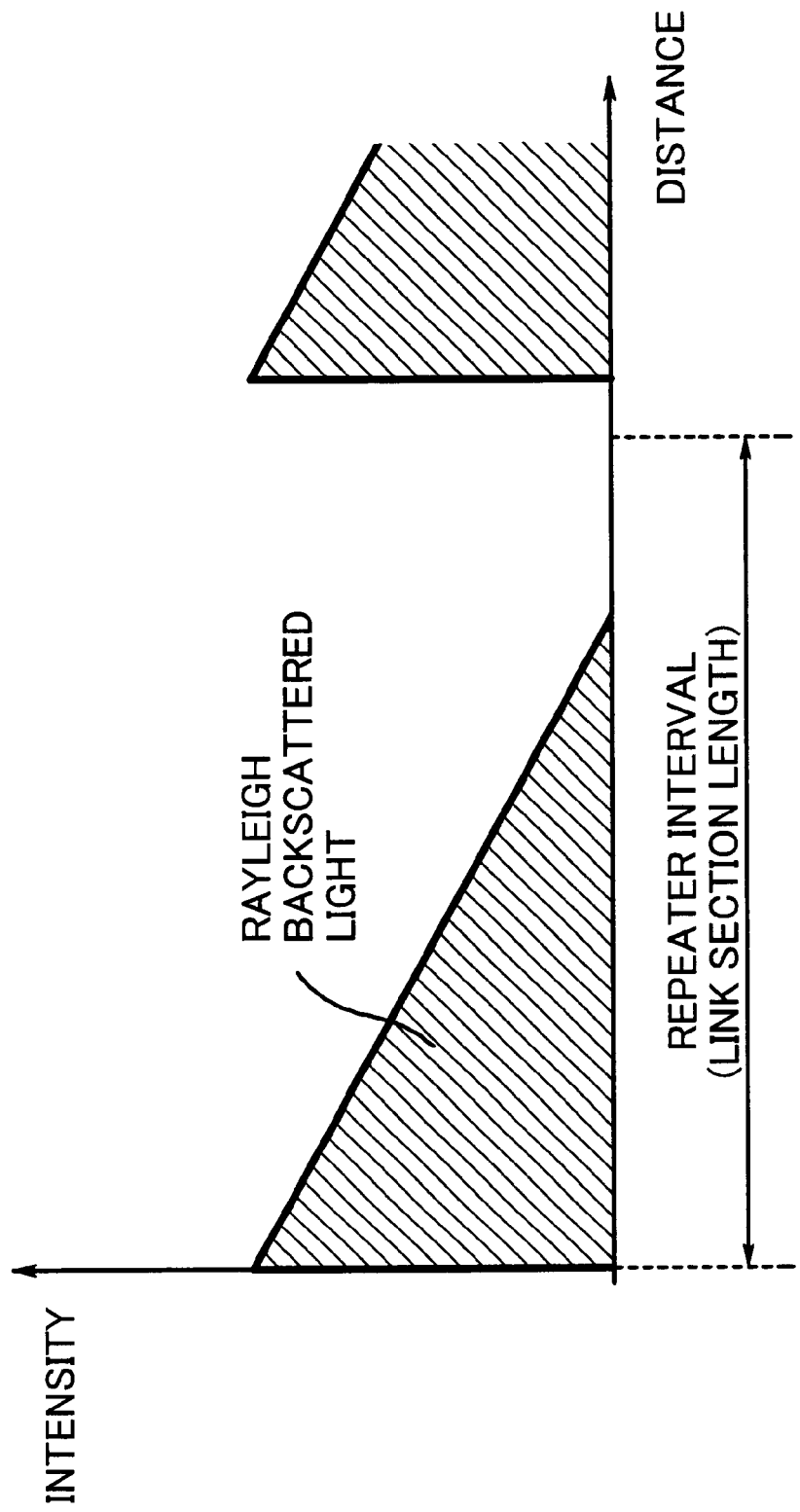
FIG. 8 shows a waveform of a Rayleigh scattered light.
Figure 9:
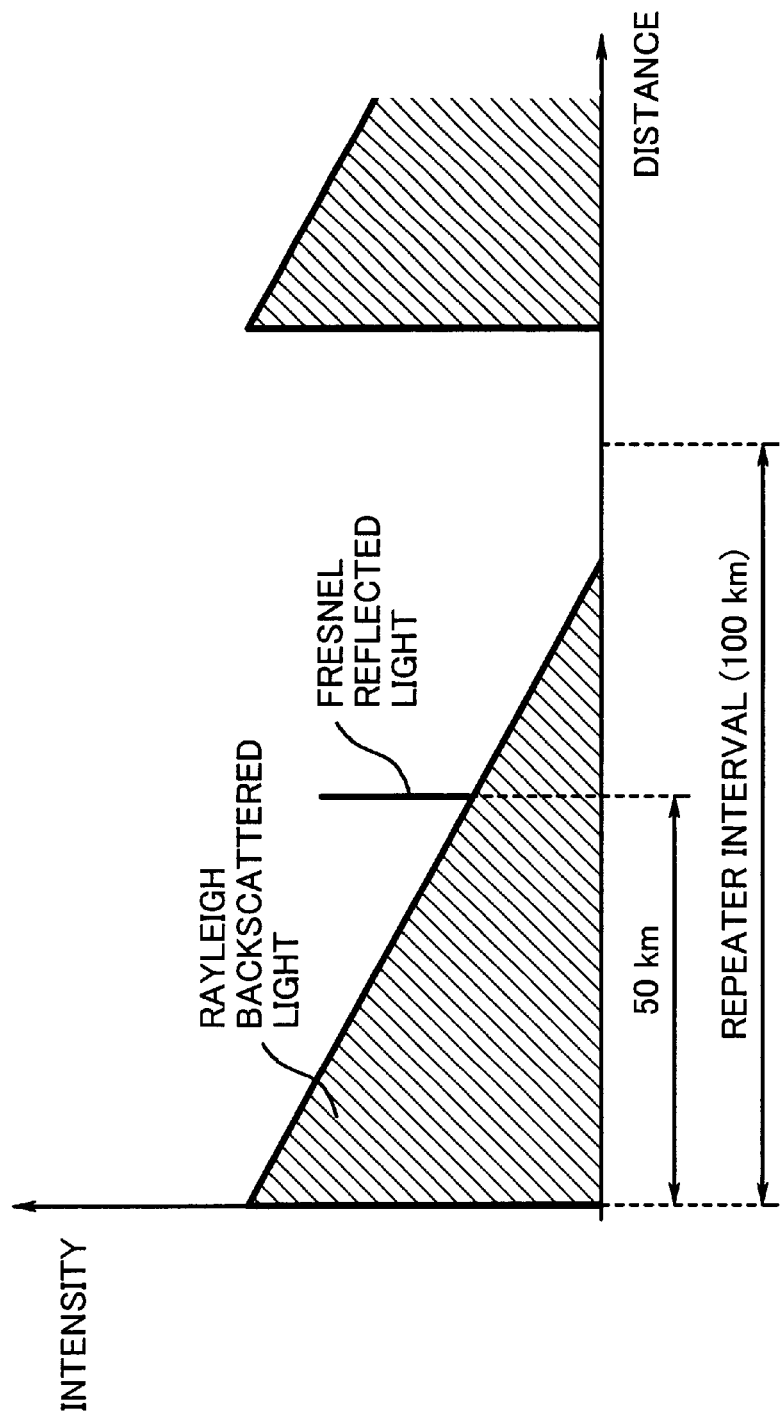
FIG. 9 shows another waveform of a Rayleigh scattered light.
Figure 10:
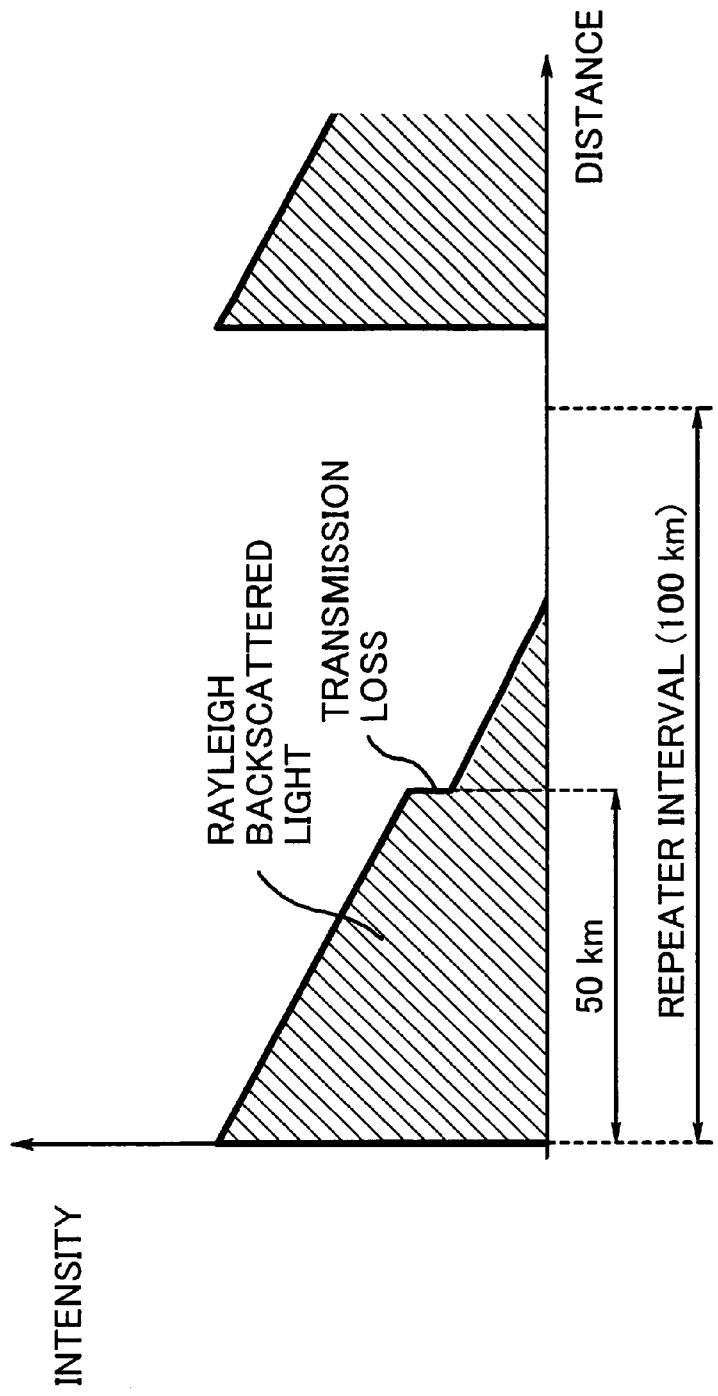
FIG. 10 shows yet another waveform of a Rayleigh scattered light.

Referring next to FIGS. 8 to 10, the following section will show a few examples of Rayleigh backscattered lights. In all those figures, the vertical axis represents the intensity of the backscatter. The horizontal axis represents the distance from the observing end, which is actually measured in the time domain.

FIG. 8 shows a typical Rayleigh backscattered light observed when there is no problem in the fiber optic cable. Probing light pulses are transmitted at predetermined intervals that are longer than the light propagation time of the link section under test. As the probing light pulse travels toward the far end of the link, the resulting backscatter comes back in the opposite direction, decreasing its intensity at a constant rate.

FIG. 9 shows a Rayleigh backscattered light that could occur when there was a fiber break at some point in the link section under test. When a transmitted probing light pulse signal encounters such a break, a relatively large portion of the light is reflected back to the transmitting end. This strong reflection, termed "Fresnel reflection," is observed as a narrow peak as shown in FIG. 9.

From the status information that has been provided as the monitoring result information, the end station 20 already knows which link section is faulty, as well as the length of each link section of the network. By measuring the time at which the Fresnel reflection light arrives, the end station 20 can pinpoint the location of the fiber break. Suppose, for example, that the probing light pulse signal of FIG. 9 has been transmitted from the tenth repeater (counted from one end station) down to the next-hop link section with a length of 100 km before the eleventh repeater. As FIG. 9 shows, a narrow peak is observed at the distance of 50 km from the transmitting end (i.e., the tenth repeater), indicating the presence of a fiber break at that remote point. Note that the end station identifies this distance in time-domain measurement.

FIG. 10 shows a waveform of a backscattered light when there is a loss of transmission at somewhere on the link section under test. Suppose again that the tenth repeater has transmitted the probing light pulse signal of FIG. 10 down to the next-hop link section with a length of 100 km before the eleventh repeater. As FIG. 10 shows, a sudden drop of intensity is observed at the distance of 50 km from the transmitting end (i.e., the tenth repeater), indicating the presence of an increased loss at that remote point.

Figure 11:
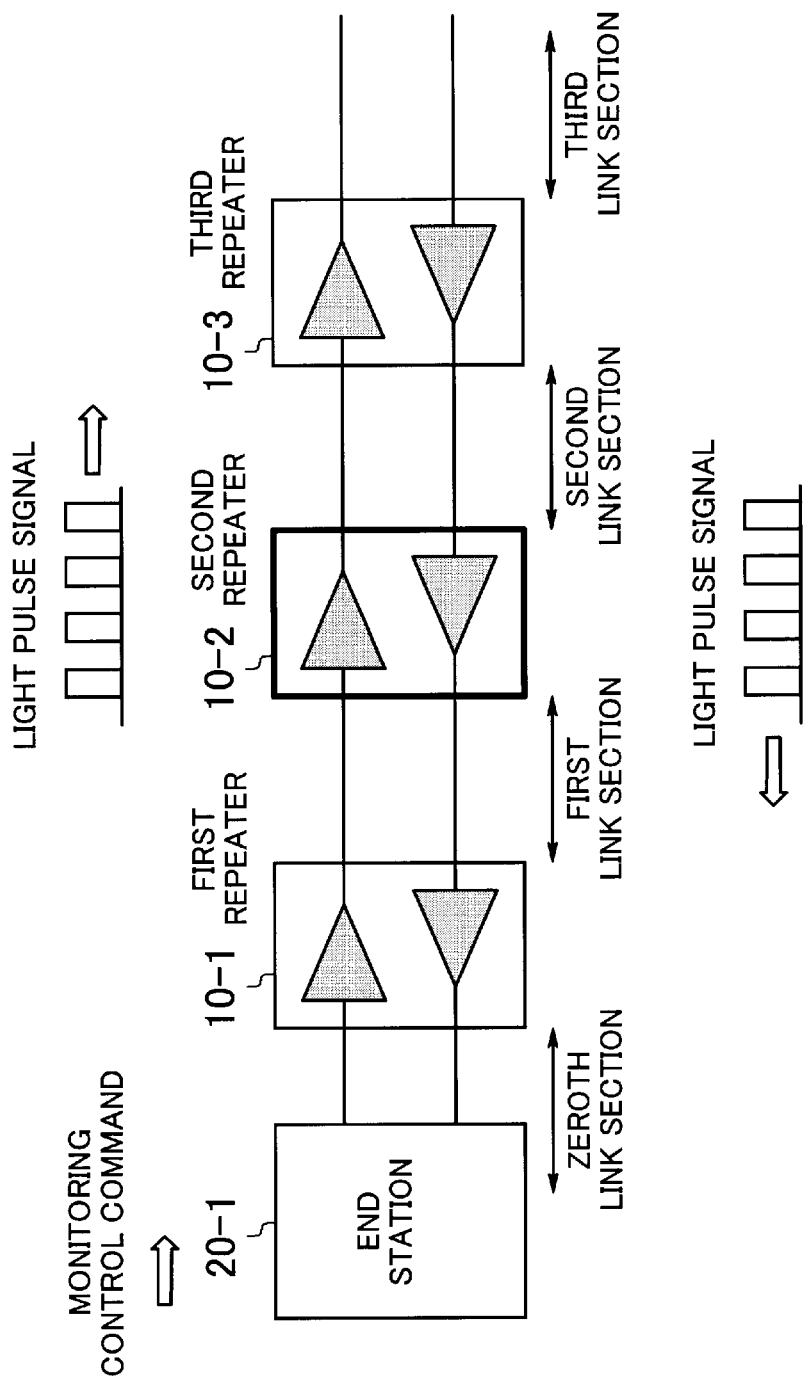
FIG. 11 shows the operation in monitoring mode.
Figure 12:
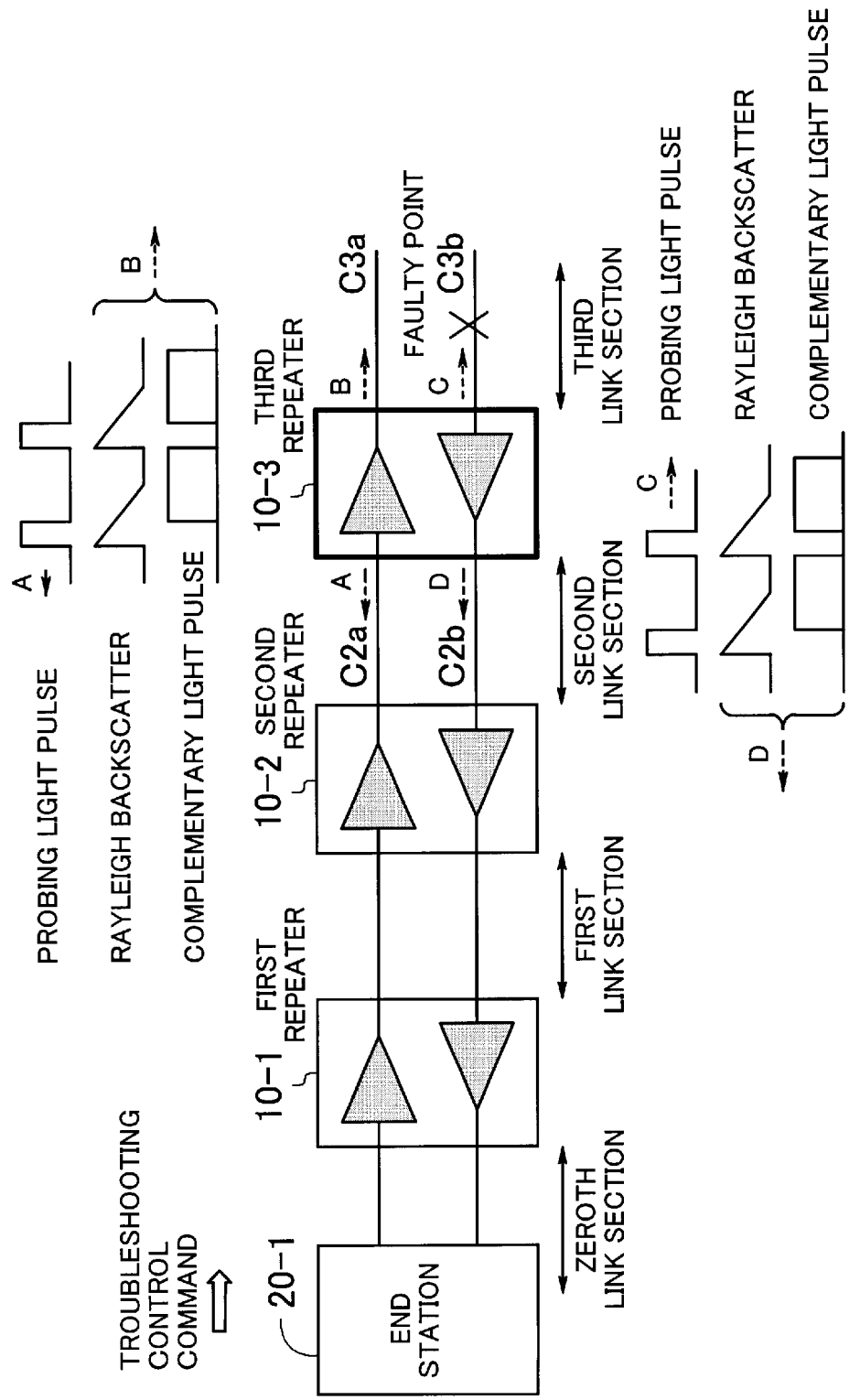
FIG. 12 shows the operation in failure detection mode.

Referring next to FIGS. 11 and 12, the process flow of troubleshooting will be discussed. First, the following section will explain the operation in the monitoring mode, with reference to FIG. 11. FIG. 11 shows one end station 20-1 and three repeaters 10-1 to 10-3, as well as four link sections connecting them in series. The individual link sections are referred to by the ordinal numbers starting with "zeroth." In FIG. 11, the zeroth link section is the nearest to the end station 20-1, and the "third" link section the furthest of all.

Suppose, for example, that the end station 20-1 is attempting to monitor the second repeater 10-2. The end station 20-1 first sends a monitoring control command containing the address of the repeater 10-2 in its header field. Upon receipt of this command, the repeater 10-2 determines whether the received monitoring control command is addressed to itself, and if so, it takes in that command. Then the repeaters 10 checks its own operating status and input/output signal conditions. The collected information is compiled as a monitoring report signal and sent out in both directions simultaneously, in the form of light pulses.

FIG. 12 illustrates how the system operates in failure detection mode. Suppose here that the end station 20-1 has collected the current status information from each repeater through the monitoring-mode processing explained in FIG. 11, and that survey indicates a problem with the third link section C3b. This link section C3b falls within the coverage area of the repeater 10-3 in terms of fault locating functions.

In an attempt to investigate the problem through the third repeater 10-3, the end station 20-1 issues a troubleshooting control command containing the address of the repeater 10-3 in its header field. Upon receipt of this command, the repeater 10-3 determines whether the received troubleshooting control command is addressed to itself, and if so, it takes in that command. According the received command, the repeaters 10-3 injects a probing light pulse signal C into the fiber optic cable of the link section C3b, as well as sending a complementary light pulse signal D toward the end station 20-1 over the link section C2b. While there is no fault detected on the other optical transmission line, another set of light pulse signals A and B are transmitted to the link sections C2a and C3a, respectively, because of the symmetrical structure of the repeater 10 discussed in FIG. 2.

Using the complementary light pulse signal D as a trigger timing signal, the end station 20-1 captures the waveform of the resulting Rayleigh backscattered light. The end station 20-1 then locates the fault in the third link section C3b by analyzing the waveform of the Rayleigh backscattered light.

Figure 13:
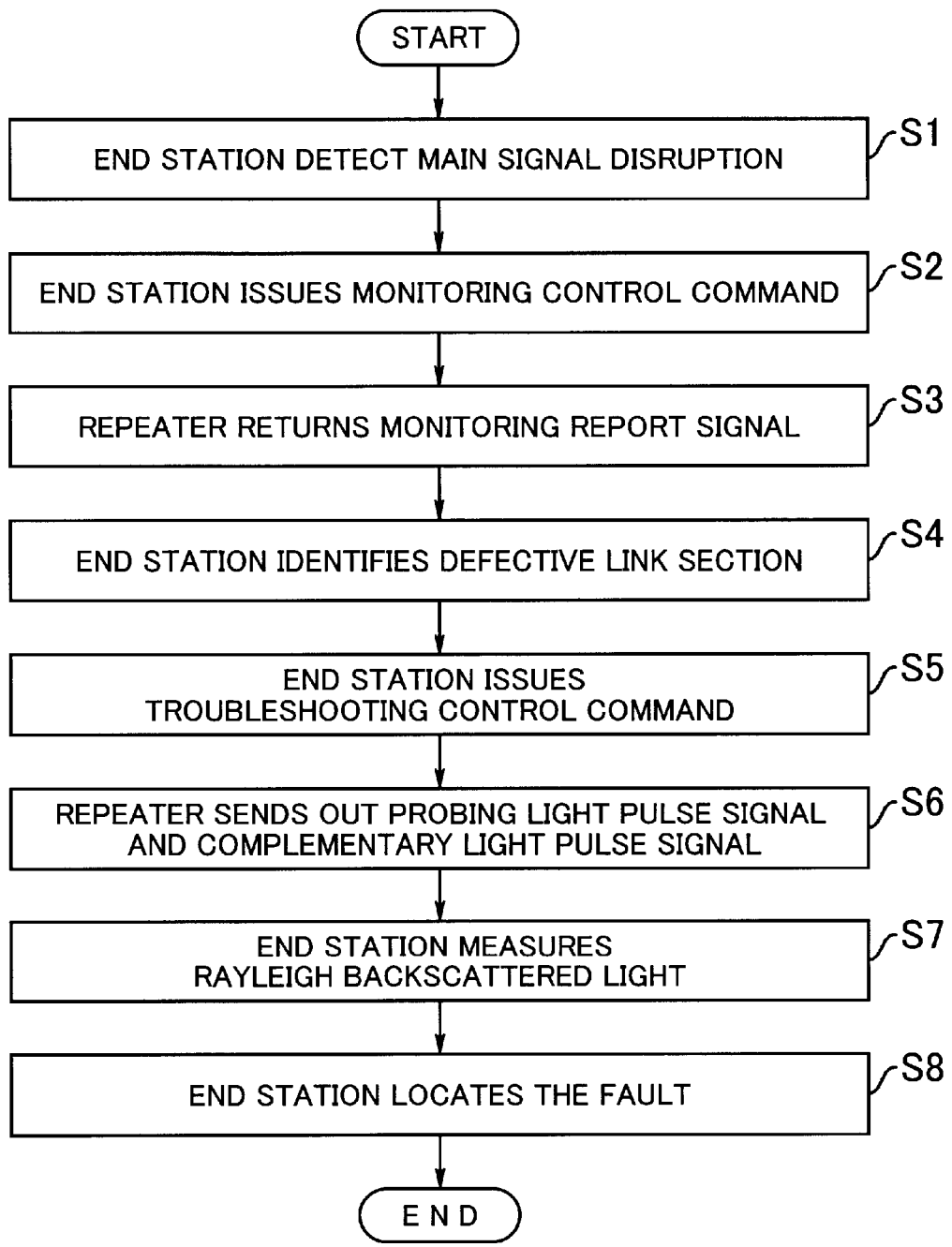
FIG. 13 is a flowchart which shows a process of troubleshooting.

FIG. 13 is a flowchart which shows a process of troubleshooting.

(S1) The main signal receiver 240 in the end station 20 detects a disruption of the main optical signal.

(S2) The end station 20 issues a monitoring control command to each repeater 10 in a sequential fashion.

(S3) Each repeater 10 collects status information in response to the monitoring control command and returns a monitoring report signal to inform the end station 20 of the monitoring results.

(S4) By analyzing the monitoring report signals received from the repeaters 10, the end station 20 identifies which section of the optical transmission line has a problem.

(S5) Now that the faulty link section is identified, the end station 20 issues a troubleshooting control command addressed to the repeater that is located immediately before the faulty section.

(S6) The specified repeater 10 sends out a probing light pulse signal, together with a complementary light pulse signal.

(S7) Using the complementary light pulse signal as a trigger timing signal, the end station 20 observes the waveform of a resulting Rayleigh backscattered light.

(S8) The end station 20 locates the fault in the link section by analyzing the waveform of the Rayleigh backscattered light.

Figure 14:
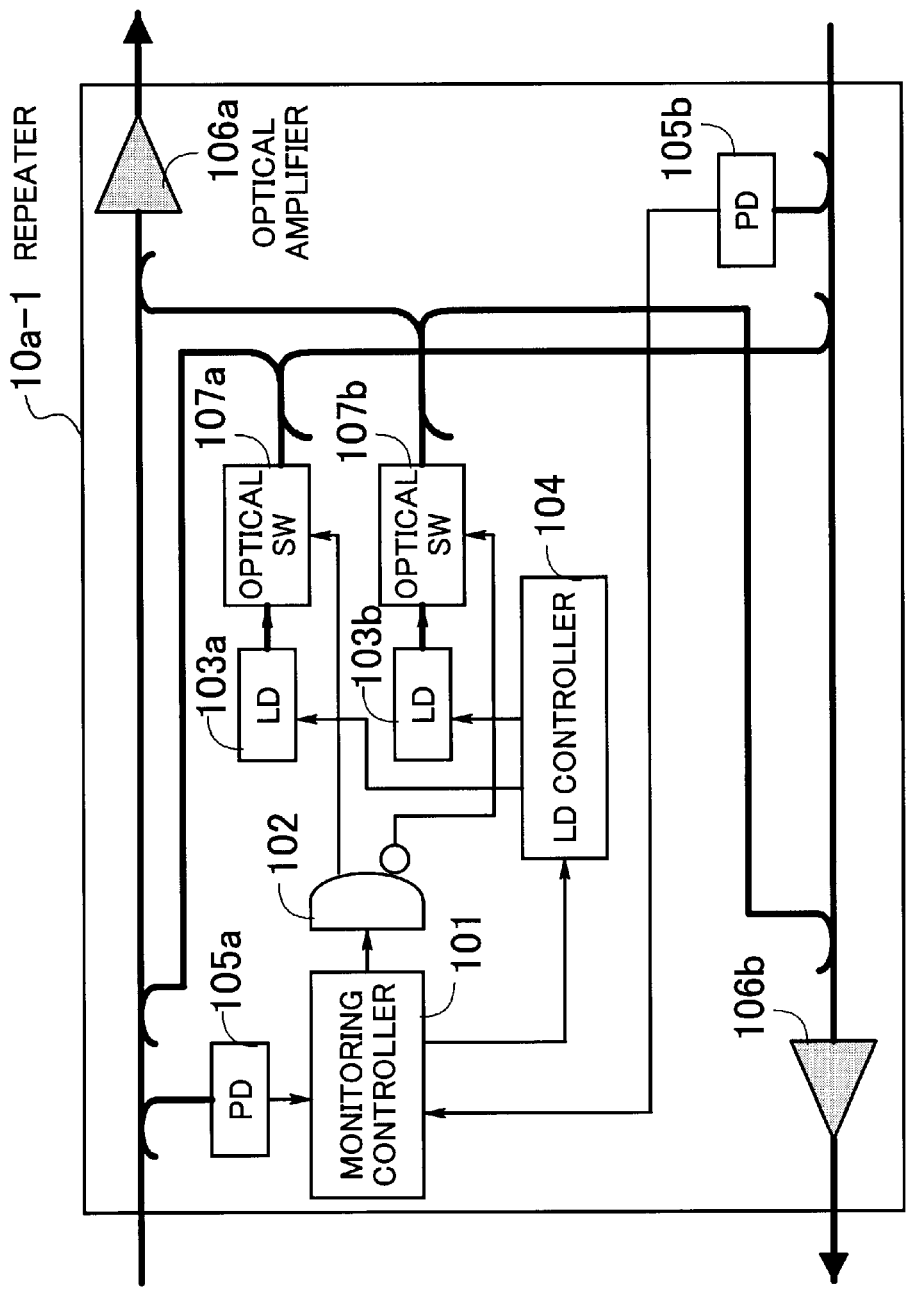
FIG. 14 shows a first variation of the repeater according to the present invention.

While one preferred embodiment of the repeater 10 has been described so far, the present invention is not limited to that specific arrangement. Rather, the proposed repeater design allows several variations in its internal configuration. One example is shown in FIG. 14. This repeater 10a-1, a first variation of the repeaters 10, employs optical switches 107a and 107b at the outputs of the laser diodes 103a and 103b, respectively. Being controlled with the complementary output signals of the logic gate 102, these optical switches 107a and 107b interrupt the light beams generated by the laser diodes 103a and 103b, thereby producing the desired probing light pulse signal and complementary light pulse signal. The other functional blocks of the repeater 10a-1 are similar to those of the repeater 10a explained earlier in FIG. 2.

Figure 15:
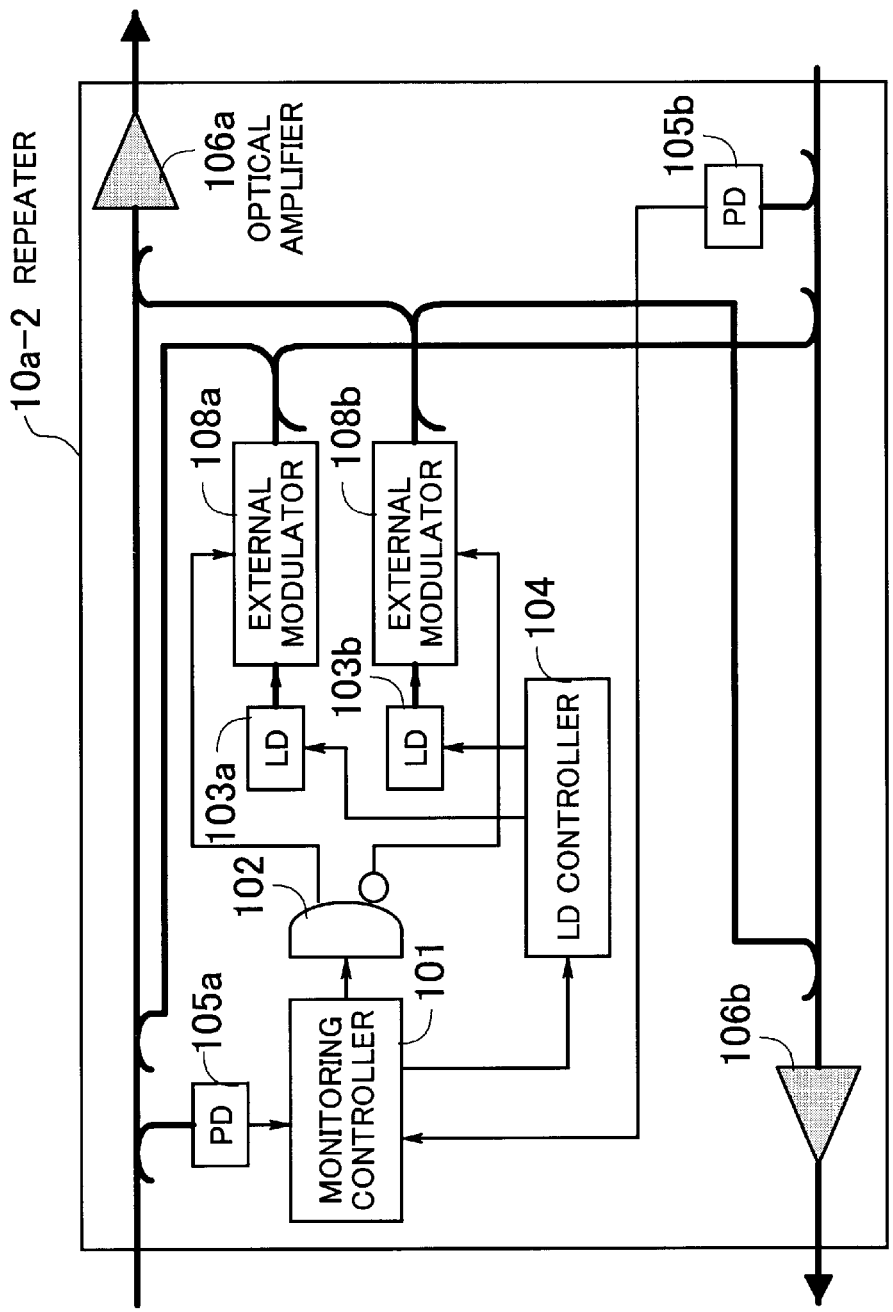
FIGS. 15 and 16 show a second and third variations of the same.

FIG. 15 shows a repeater 10a-2 as a second variation of the repeater 10. This repeater 10a-2 employs external modulators 108a and 108b at the outputs of the laser diodes 103a and 103b, respectively. Being controlled with the complementary output signals of the logic gate 102, these external modulators 108a and 108b vary the intensity of light beams generated by the laser diodes 103a and 103b, thereby producing the desired probing light pulse signal and complementary light pulse signal. The other functional blocks of the repeater 10a-2 are similar to those of the repeater 10a explained earlier in FIG. 2.

The above two variations employ optical switches or external modulators to turn on and off the light signals, instead of directly driving the laser diodes. The use of those additional components avoids the problem of chirping (variations in wavelength) of laser diodes, thus making more accurate measurement possible.

Figure 16:
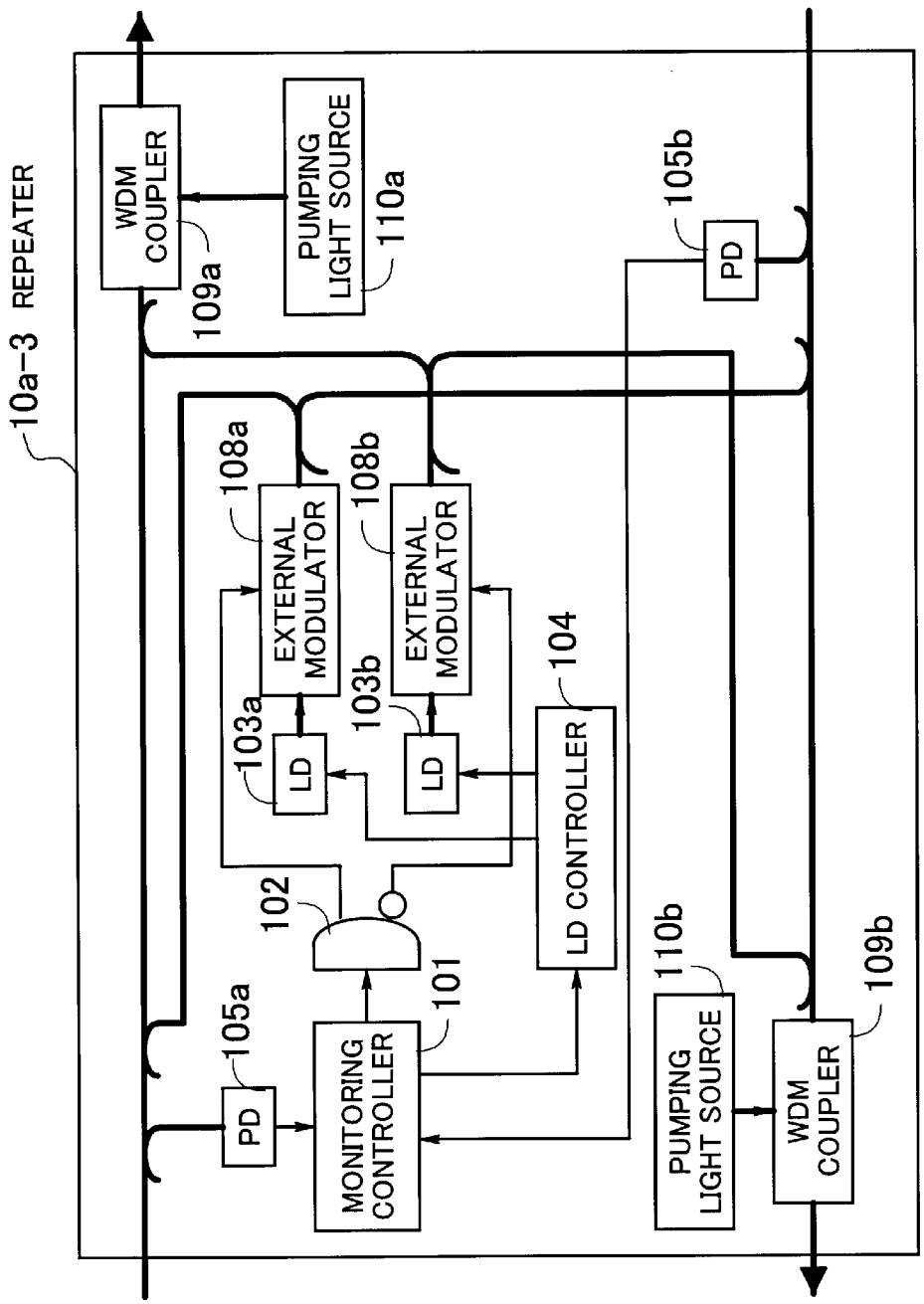

FIG. 16 shows a third variation of the repeater 10. Compared to the repeater 10a-2 of FIG. 15, this repeater 10a-3 employs wavelength division multiplex (WDM) couplers 109a and 109b and pumping light sources 110a and 110b in place of the optical amplifiers 106a and 106b.

The pumping light sources 110a and 110b are optical power sources for Raman amplification. Raman amplification is an optical amplification technique that takes advantage of a non-linear phenomenon in an optical fiber. When a light traverses through molecules, some of the scattered lights will have wavelengths that are different from that of the incident light because of vibrations of the scattering molecules. This physical phenomenon, called Raman effect, can be used to amplify a light beam. In Raman amplifiers, a strong pumping light beam with a shorter wavelength (e.g., 1.45-$\mu$m pump beam for 1.55-$\mu$m seed beam) is given to the entire transmission medium, so that a given seed beam will be directly amplified. The WDM couplers 109a and 109b serve as Raman amplifiers, receiving pump beams from the pumping light sources 110a and 110b and transmitting the amplified light signals over the fiber optic cables.

As described above, the repeaters 10a-3 uses distributed-constant optical amplifiers based on Raman amplification principles. This arrangement enhances the signal repeating capabilities, offering a great advantage in long-haul communication applications. Besides improving the stability of main optical signal transport, the proposed configuration enables more stable transmission of probing light pulse signals, thus contributing to more accurate operations of optical reflectometry.

The above discussion will now be summarized as follows. In the optical transmission system 1 of the present invention, each repeater 10 provides a monitoring report signal to inform the end station 20 of its current operating status. Based on the monitoring report signals, the end station 20 identifies a faulty link section if a problem is found in the optical transmission line. The end station 20 then sends a troubleshooting control command to the relevant repeater, and in response to this command, the repeater 10 transmits a probing light pulse signal and a complementary light pulse signal in order to locate a fault on the transmission line.

Some of the probing light pulse signal would be reflected back toward the end station as a result of Rayleigh scattering. Using the complementary light pulse signal sent from the repeater 10 for synchronization, the end station 20 captures and analyzes the Rayleigh backscatter, thereby locating the fault of the optical transmission line.

The above mechanism of the present invention detects an increased fiber loss in an effective and efficient manner, in addition to locating a breakage of the fiber optic cable and isolating a repeater failure. The proposed troubleshooting mechanism is effective to both undersea and terrestrial applications of fiber optic networks.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission system with a mechanism to locate a fault on an optical transmission line, comprising:
    (a) repeaters which relay optical signals over the optical transmission line, each repeater comprising:
    monitoring report signal generating means, responsive to a monitoring control command, for monitoring a current operating status and input/output signal conditions of said each repeater, and generating a monitoring report signal that contains results of the monitoring; and
    light pulse signal sending means, responsive to a troubleshooting control command, for sending a probing light pulse signal to the optical transmission line to locate a fault thereon, as well as a complementary light pulse signal that is complementary to the probing light pulse signal; and
    (b) an end station which controls optical signal transmission and remotely controls said repeaters, said end station comprising:
    (b1) a monitoring controller, comprising: monitoring control command sending means for sending the monitoring control command; and
    monitoring report processing means for monitoring the operating status of said repeaters by analyzing the monitoring report signals received therefrom, and identifying a faulty link section if any problem with the optical transmission line is detected; and
    (b2) a troubleshooting unit, comprising:
    troubleshooting command sending means for sending the troubleshooting control command to one of said repeaters that is located near to the identified faulty link section;
    Rayleigh backscatter measurement means for measuring a Rayleigh backscattered light caused by the probing light pulse signal, using the complementary light pulse signal as a reference for synchronization; and
    fault detection means for locating the fault on the faulty link section by analyzing the measured Rayleigh backscattered light.

2. The optical transmission system according to claim 1, wherein said end station superimpose the monitoring control command and troubleshooting control command on a main optical signal for delivery to said repeaters.

3. The optical transmission system according to claim 1, wherein said repeaters comprise an optical switch or an external modulator that is coupled to a light emitting device to modulate an outgoing optical signal produced therefrom.

4. The optical transmission system according to claim 1, wherein each of said repeaters comprise an optical amplifier that utilizes a non-linear optical phenomenon in an optical fiber to amplify given optical signals.

5. A repeater which relays optical signals over an optical transmission line, comprising:
    monitoring report signal generating means, responsive to a monitoring control command sent from an end station, for monitoring a current operating status and input/output signal conditions of the repeater, and generating a monitoring report signal that contains results of the monitoring; and
    light pulse signal sending means, responsive to a troubleshooting control command from the end station, for sending a probing light pulse signal to the optical transmission line to locate a fault thereon, as well as a complementary light pulse signal that is complementary to the probing light pulse signal.

6. An end station which remotely controls repeaters relaying optical signals, said end station comprising:
    (b1) a monitoring controller, comprising:
    monitoring control command sending means for sending a monitoring control command to each of the repeaters, the monitoring control command causing each repeater to send back a monitoring report signal; and
    monitoring report processing means for monitoring operating status of each of the repeaters by analyzing the received monitoring report signal, and identifying a faulty link section if any problem with the optical transmission line is reported; and
    (b2) a troubleshooting unit, comprising:
    troubleshooting command sending means for sending a troubleshooting control command to one of the repeaters that is located near to the identified faulty link section, the troubleshooting control command causing the receiving repeater to generate a probing light pulse signal and a complementary light pulse signal;
    Rayleigh backscatter measurement means for measuring a Rayleigh backscattered light caused by the probing light pulse signal, using the complementary light pulse signal as a reference for synchronization; and
    fault detection means for locating the fault on the faulty link section by analyzing the measured Rayleigh backscattered light.

* * * * *